March 26, 1968  R. MANSSON ET AL  3,375,172

FUEL ASSEMBLY FOR NUCLEAR REACTORS

Filed May 4, 1966  2 Sheets-Sheet 1

INVENTOR.
RAGNAR MANSSON
HARALD SKAR
BY Bailey, Stephens + Huettig
ATTORNEYS

March 26, 1968 R. MANSSON ET AL 3,375,172
FUEL ASSEMBLY FOR NUCLEAR REACTORS
Filed May 4, 1966 2 Sheets-Sheet 2

INVENTOR.
RAGNAR MANSSON
HARALD SKAR
BY
Bailey, Stephens + Huettig
ATTORNEYS

United States Patent Office 3,375,172
Patented Mar. 26, 1968

3,375,172
FUEL ASSEMBLY FOR NUCLEAR REACTORS
Ragnar Mansson, Vasteras, and Harald Skar, Lidingo, Sweden, assignors to Allmanna Svenska Elektriska Aktiebolaget, Vasteras, Sweden, a corporation of Sweden
Filed May 4, 1966, Ser. No. 547,541
Claims priority, application Sweden, May 4, 1965, 5,789/65
9 Claims. (Cl. 176—78)

ABSTRACT OF THE DISCLOSURE

A nuclear fuel assembly having a number of parallel fuel rods spaced apart by cross-spacers and an axial spacer for determining the axial position of the cross-spacers. The fuel rods are supported by fixing plates, being secured to one and guided in holes in another. The axial spacer forms a supporting part of the fuel assembly, and all fuel rods are undivided; have no supporting function; and are alike with regard to their mode of connection and support.

---

The present invention relates to a fuel assembly for nuclear reactors which assembly comprises a number of parallel fuel rods and cross-spacers for fixing the mutual distance between the fuel rods.

The spacers which are normally used in fuel assemblies for fixing the mutual distance between the fuel rods are usually arranged at several positions along the fuel assemblies which are often very long. For fixing these so-called cross-spacers in axial direction previously a part of the fuel rods has been divided and the spacers have been clamped between the parts of the divided fuel rods connected to each other with threaded joints. This construction means, however, that two different types of fuel rods are required, whole and divided, of which the divided ones can also be different among themselves. Thereby the construction of the fuel assemblies becomes more complicated and more expensive.

The object of the present invention is to effect robust and durable fuel assemblies for the lowest possible manufacturing costs, in which the most important part, the fuel rods, at least not due to the actual attachment requirements need to be of different construction. The invention is characterized in that the fuel rods at least at one end are connected to a longitudinally extending member arranged to determine the position of the cross-spacers in the longitudinal direction of the fuel rods. The longitudinal member may at the same time form a supporting part of the fuel assembly and thus contributes to give this increased stability. By reason of the fact that the cross-spacers are fixed axially all the fuel rods can be formed alike with regard to their mode of connection. By this means the erection of the assembly is also facilitated.

A fuel assembly according to the invention is constructed preferably with polygonal, for example square cross-section and longitudinal members can thus be arranged in one or several of the corner points of the polygonal cross-section. By this means the longitudinal members are placed in the most favourable position for the functioning of the reactor. If it is desired to fix both ends of the fuel rods to one or several longitudinal members it is suitable to arrange a resilient support in one end of the fuel rod because the fuel rods undergo length changes under temperature variations.

Figure 1:
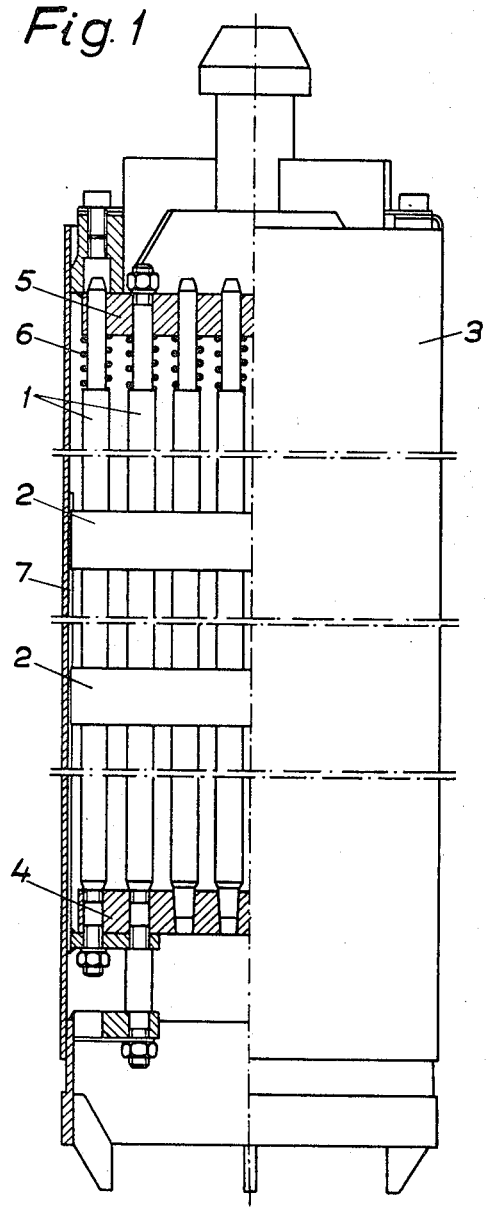
Figure 2:
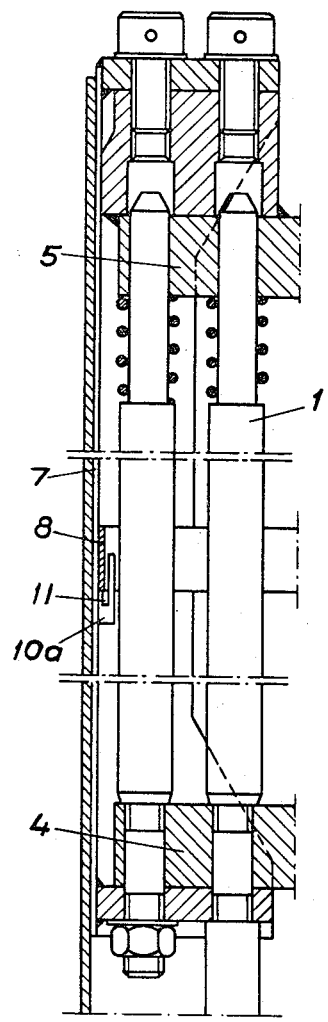
Figure 3:
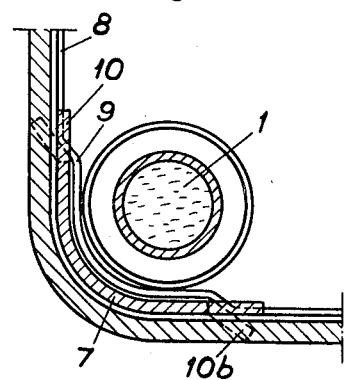

In the following the invention will be clarified with reference to the accompanying figures. FIGURE 1 shows in axial section a fuel assembly according to the invention. FIGURE 2 shows a part of another embodiment of the invention. FIGURE 3 shows a cross-section of a corner of a fuel assembly according to the invention.

In the figures, 1 designates the fuel rods and 2 the cross-spacers which fix the mutual distance between the fuel rods. The fuel rods are surrounded by an outer casing 3 and at their ends are fixed in fixing plates 4 and 5. In the lower fixing plate 4 the fuel rods are rigidly connected, but at the upper plate 5 the fuel rods can move in an upward direction of the figure against the thrust of fixing springs 6. A longitudinal member 7 is connected with the cross-spacers 2 and with the bottom plate 4. The member 7 thus determines the axial position of the cross-spacers 2. In the following the system for determining the axial position of the cross-spacers will be called the axial spacer. FIGURE 2 shows an axial spaced which is connected with the upper as well as the lower fixing plate. The axial spacer comprises preferably several longitudinal members 7. The axial spacer can possibly be made as a construction wholly or partly enclosing the fuel assembly so that it replaces the casing tube 3.

FIGURE 3 shows a cross-section of a corner of a square or rectangular fuel assembly according to the invention. Only one fuel rod 1 is shown. The longitudinal member of the axial spacer is as before denoted by 7 and comprises an angularly bent bar. The outer frame 8 of the cross-spacer is provided with an inward bend 9 which corresponds to the dimensions of the plate bar 7 so that the outer side planes of the cross-spacer and axial spacer substantially coincide. The remaining corners of the fuel assembly are constructed in the same way as that shown in the figure and the axial spacer consequently comprises in this case four angle bars 7. For fixing the cross-spacers the bars 7 are bent in over the edges of the cross-spacers and this is carried out most easily if the angle bars 7 are provided with tongues 10 above and below the cross-spacers.

As is shown in FIGURE 2 the lower tongue 10a may be provided with a slot 11 receiving the frame 8 in the cross-spacer. The slot 11 is constructed preferably as shown in the figure so that a certain axial movement can take place between the cross spacer 8 and the bars 7. This sliding connection of the axial spacer and the cross-spacers is necessary in order to make possible the mutual movements caused by different temperature conditions.

The upper tongue of the axial spacer is bent outward to the position 10b before the erection of the fuel assembly, as shown in FIGURE 3 by dashed lines. When the cross-spacer has been fitted in its place the upper tongue is bent to the position shown in the figure with full lines.

The invention is not limited to the shown embodiments, but a plurality of variations and modifications are feasible within the scope of the following claims.

We claim:
1. Fuel assembly for nuclear reactors comprising a number of parallel fuel rods, cross-spacers fixing the mutual distance between said fuel rods, a longitudinally extending support member, two fixing plates, said fuel rods being rigidly connected to one of said fixing plates and movably connected to the other, means connecting at least one of said fixing plates to said longitudinally extending support member, and means connecting the cross-spacers to the support member to fix the position of said cross-spacers in the longitudinal direction of said fuel rods.

2. Fuel assembly according to claim 1, having polygonal cross-section, the support member being placed in a corner point of the polygonal cross-section.

3. Fuel assembly according to claim 1, said support member being rigidly connected to the one end of the fuel rods, and resilient means between the other ends of the fuel rods and one of said fixing plates.

4. Fuel assembly according to claim 1, the connection between the support member and the cross-spacers including means to allow limited axial movement between said support member and said spacers.

5. Fuel assembly according to claim 1, said support member comprising a plurality of angularly bent plate members.

6. Fuel assembly according to claim 5, the outer edges of said plate members being bent in over said cross-spacers.

7. Fuel assembly according to claim 6, said plate members being provided with tongues which are bent in over said cross-spacers.

8. Fuel assembly according to claim 7, one of said tongues being provided with a slot extending in the longitudinal direction of the fuel rods for receiving a rigid part of the cross-spacer.

9. Fuel assembly according to claim 5, said cross-spacers being provided with an outer frame having an inwardly bent portion corresponding to the dimensions of said plate members so that the outer side planes of the cross-spacers and the bent plates substantially coincide.

References Cited

UNITED STATES PATENTS

| | | | |
|---|---|---|---|
| 3,158,549 | 11/1964 | Fowler | 176—78 |
| 3,185,632 | 5/1965 | Bradley | 176—78 X |
| 3,205,148 | 9/1965 | Waine et al. | 176—78 |
| 3,227,621 | 1/1966 | Hargo et al. | 176—78 X |
| 3,228,854 | 1/1966 | Bekkering et al. | 176—78 |
| 3,239,426 | 3/1966 | Waine et al. | 176—78 |
| 3,278,388 | 10/1966 | Thome | 176—78 |

CARL D. QUARFORTH, *Primary Examiner.*

M. J. SOLNICK, *Assistant Examiner.*